Patented Dec. 27, 1949

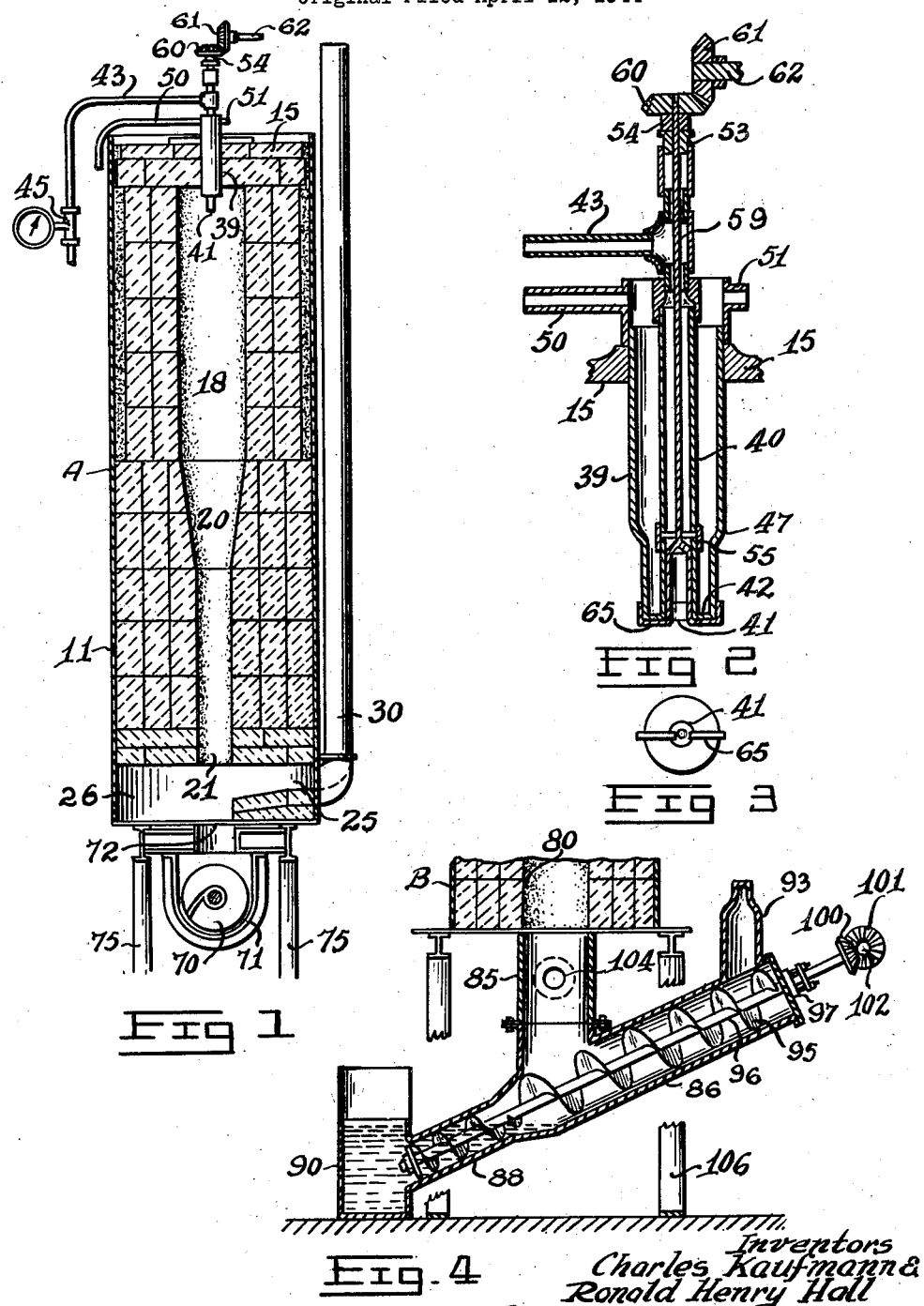

2,492,481

UNITED STATES PATENT OFFICE 2,492,481

APPARATUS FOR MAKING CARBON BLACK

Charles Kaufmann, Ottawa, Ontario, and Ronald Henry Hall, Shawinigan Falls, Quebec, Canada, assignors to Shawinigan Chemicals Limited, Montreal, Quebec, Canada, a corporation of Canada Original application April 12, 1944, Serial No. 530,638. Divided and this application October 11, 1948, Serial No. 53,784. In Canada May 11, 1943

3 Claims. (Cl. 23—259.5)

This invention relates to the production of carbon black and more particularly to the production of a carbon black having special characteristics. This application is a divisional of application Serial Number 530,638, filed April 12, 1944, now Patent No. 2,453,440.

For certain critical uses, carbon black must have particular properties such as chemical purity, high conductivity, the ability to absorb liquids to a high degree, the capacity to maintain form stability or stiffness in the presence of liquids, and uniformity in these respects.

The application referred to above discloses a continuous process of forming carbon black from an endothermic hydrocarbon gas. The process involves the following steps. The chamber is heated initially to a temperature at which the gas will dissociate into carbon black and hydrogen. The gas is then continuously introduced into the heated chamber in the form of a stream of appreciably smaller cross section than that of the chamber and is cooled as it is introduced into the chamber. The rate of introduction of the gas is effective to maintain the dissociation temperature from the heat given off in the reaction and is maintained substantially constant so as to cause substantially uniform structural formation of the carbon black. The inlet constituting the point of introduction of the gas into the chamber is continuously cleaned mechanically.

The present invention relates to a specific apparatus in which such a process may be carried out.

This apparatus includes the following features. It includes a vertical chamber in which the gas is decomposed. A cylindrical tube extends axially to a point within the chamber and is adapted to conduct gas into the chamber. A cylindrical jacket for cooling liquid surrounds the tube and extends directly to the end thereof projecting with the tube into the chamber. There is a fluid connection to the jacket so that cooling fluid can be circulated around the tube which extends upward from the jacket to a gas connection. Scraping means is provided having portions conforming to the inner surface of the tube adjacent its outlet and a portion conforming to the surface of the jacket for the purpose of scraping off carbon deposits which may form on the surfaces of the tube and jackets at points at which they are exposed to the heat of the reaction. There is means for actuating the scraping means in such a manner as to cause this means to run over the surface of the tube and jacket and keep it clean. Preferably, the scraping means is a U-shaped scraper of which a portion fits the inside of the tube, another portion the bottom portion of the tube and jacket, and the extremity the vertical outside of the jacket. In the preferred embodiment of the invention, the means for actuating the scraping means consists of a shaft connected to the scraper and extending upwards through the tube and beyond, through sealing means, to means for rotating the shaft. There is a gas connection to the tube between the sealing means and the inlet to the chamber and there is means for introducing gas through the gas connection continuously at a uniform rate. The chamber includes an outlet adjacent to its bottom to allow for continuous discharge of carbon black and gas, as formed by the reaction in the chamber.

In accordance with the invention, the hydrogen gas resulting from the exothermic reaction may be burned or else it may be collected by a modification of the apparatus which forms a part of the invention. This includes an inclined passage leading from the outlet of the retort, a water seal at the lower end of the passage, a gas outlet at the upper position in the passage, and means for moving the black downwards through the passage into the water seal. According to a preferred construction this passage is a conveyor tube and the means for moving the black is a screw conveyor provided with suitable driving means.

The invention will be more fully understood by reference to a preferred embodiment which is illustrated in the accompanying drawings by way of example, and in which:

Figure 1 is a vertical cross sectional view of an apparatus conveniently suitable for the production of black according to the invention, including a retort and an inlet unit for supplying gas thereto.

Figure 2 is an enlarged vertical cross sectional view of the gas inlet unit of the apparatus shown in Figure 1.

Figure 3 is a bottom plan view of the inlet unit shown in Figure 1.

Figure 4 is a vertical cross sectional view of an alternative form of gas residue disposal arrangement for use in conjunction with an apparatus similar to that shown in Figures 1 and 2.

Retort

Referring, therefore, more particularly to Figures 1 through 4 of the drawings, A is an enclosed cylindrical retort, preferably vertically disposed, for dissociating the elements of the endothermic gas, collecting the carbon as "black" and burning the hydrogen. The retort A has a lining of suitable refractory material such as fire brick and a steel shell 11. In the preferred embodiment indicated, the retort is cylindrical in form and of dimensions suitable, as will be more fully explained, for the production of black of the special characteristics defined above. It is vertically disposed and closed at its upper end by a removable top 15. The upper portion 18 is of substantially constant diameter. The lower end 20 of the retort is tapered to increase the velocity of the gas and to minimize the possibility of air entering and terminates in an outlet 21. The portions 18 and 20 constitute the dissociation chamber. Usually for commercial production a series of retorts of this construction are arranged in batteries.

A large flue 25 extends below the retort from the front to the back thereof and is in communication with the outlet 21. This flue is open at the front 26 for the entrance of air and for observation and communicates at the rear through suitable connecting means with an upwardly extending stack 30 for drawing off gases.

Inlet unit

At the upper end of the retort, an inlet unit 39 is supported by the cover 15. This unit is axially aligned with the retort and enters the latter through an air-tight opening in the cover. The unit comprises a central metallic tube or passage 40 for the entering gas. The upper end of the passage 40 is connected to a gas line 43 controlled by a Venturi meter 45 for measuring accurately the amount of gas fed and assuring a constant flow to the retort at a predetermined rate. A gas line leads from a pump (not shown) to the meter 45 so that the gas may be pumped at a constant rate of flow and under pressure. This enables the gas to be fed at a constant rate independent of conditions within the retort, e. g., back pressures. The lower end 41 of the tube 40 constitutes an inlet nozzle. Surrounding the tube 40 is a metallic casing or jacket 47 which is connected to the cover 15 and has a horizontal lower end 42 joined to the end 41. Connected to the jacket there leads a water supply pipe 50 and a water outlet 51. A supply pipe 50 is connected to a suitable source of water supply, preferably cold water adapted to cool the entering gas, so as to lessen the possibility of polymerization and deposition of carbon adjacent the inlet, and to prevent damage to the inlet structure.

Cleaning device

Extending upwardly from the upper end of the tube 40 is a structure including a packing box 53 forming a seal, and a bearing 54. Adjacent the foot of the tube 40 is a spider bracket 55 including a bearing. A vertical shaft 59 journalled in the brackets 54 and 55 extends throughout the height of the inlet unit. At the upper end of the shaft is driving means including a bevel gear 60 meshing with a bevel gear 61 on a horizontal shaft 62 held in a suitable bearing (not shown) and driven from a suitable source of power (not shown). On the lower end of the shaft 59 is mounted a scraping arrangement adapted effectively to free the inlet 41 and surrounding surfaces from carbon which tends to build up during the reaction. This arrangement consists of substantially U-shaped scrapers 65 made of suitable metal and adapted to fit snugly against the walls of the tube 40 to engage the horizontal portion between the end of the tube 40 and the jacket 47 and to extend a short distance upward outside the jacket 47. The top end of each of these scrapers is suitably and firmly attached to the lower end of the shaft 59. The various parts are constructed of suitable materials for fulfilling their respective functions.

Underneath the retort is a collecting means including a transversely extending screw conveyor 70 operating in a trough 71 adapted to catch the very small proportion of solids which falls through an opening 72 directly underneath the outlet 21 of the retort. The entire structure is held on supports 75.

Alternative structure

An alternative structure for the collecting and residual gas disposal features is shown in Figure 4 whereby the gas constituent given off from the dissociation may be collected instead of burned. This structure includes a cylindrical retort B similar to the retort A. In this case, however, the lower end 80 of the retort is of the same diameter as the upper end, e. g. is not tapered, although it may be tapered if desired. A discharge chute 85 leads downwardly from the bottom of the retort and meets the middle portion of a sloping passageway or conveyor tube 86. This tube is connected at its lower end 88, which is preferably of reduced diameter, with a water seal 90. The upper end of the tube 86 includes a gas outlet 93. Adapted to operate in the tube 86 is a screw conveyor 95 having a shaft 96 held in bearings 97 and 99 (not shown), one at each end of the tube. The shaft 96 extends outwardly from the upper end of the tube and is provided on that end with a bevel gear 100 meshing with another bevel gear 101 on the shaft 102, driven from a suitable source of power (not shown). The retort B is mounted on suitable supports 106 which have been partially broken away to show the collection mechanism. An outlet 104 is provided in the chute 85 which may be used as a flue so that the retort may be converted to burning the residual gas instead of collecting it. When collecting the residual gas this outlet is closed.

Operation

The retort is heated to decomposition temperature of the gas by any suitable means, as for example, by combustion of the acetylene by means of air. After the decomposition temperature has been established, gas is fed under pressure sufficient to ensure a uniform steady flow at a desirable rate from storage through the meter 45 down the tube 40 into the retort. A preferred pressure is about 1.5 lbs. per sq. in. above atmospheric. The gas supply is carefully regulated and controlled by the use of the meter 45 to achieve a suitable substantially constant rate of flow from the inlet 41 into the retort. Dissociation of the gas into its components carbon and hydrogen takes place whereupon large flakes of flocculent black appear at the bottom of the retort. The continuous input of gas serves to expel the hydrogen and black through the outlet 21 in the case of retort A or the outlet 80 in the case of retort B.

In retort A the hydrogen is ignited at the outlet 21 and the resulting combustion gases together with the black and excess air are drawn by suction into the collection pipe 30. In the case of retort B, the hydrogen finds its way, in this case, without being ignited or mixed with air through the gas outlet 93, while the black is transported by a screw conveyor in the opposite direction through the conveyor tube 86 and a water seal 90. Owing to its buoyancy the black immediately floats to the top of the water and passes along its surface to suitable collecting means. Air is effectively excluded from mixing with the hydrogen by the water seal.

As the process proceeds, the scraping device 65 is operated to keep the inlet 41 substantially free from carbon which would otherwise tend to build up on this inlet. This not only maintains the size of the inlet constant, but also serves to maintain the uniformity of the black as regards quality.

Retort size

Within practical limits, the diameter of the retort may vary greatly. It is not considered practical to use retorts below about 6 inches in internal diameter because they tend to become blocked with black. Extremely practical operations have been carried out in retorts of about 11 inches and about 22 inches in internal diameter respectively. Retorts of larger diameter may also be employed. For practical purposes, therefore, the permissible diameter of the retort may be considered as variable from about 6 inches and upwards to within the limits of mechanical, constructional, and operational difficulties involved. Commercially, it is usually more feasible to use a battery of smaller retorts rather than a single large retort. A preferred height for either the 11 inch or the 22 inch retort is between about 3 and about 9 feet from the inlet 41 to the outlet 21.

Inlet size and flow rate

The applicants have also found that the cross-sectional area of the gas stream, i. e. the internal diameter of the gas inlet is of distinct importance in terms of the quality of the black produced, but this dimension must, of necessity, be considered in conjunction with the rate of flow of the gas.

The rate of flow is similarly tied up with the size of the retort and with that of the gas inlet. Experience has shown that there is an acceptable range of flow for each inlet size and that within this range there is a specific flow rate at which the optimum grade of black is produced as will be evident from prior application Serial Number 530,638, filed April 12, 1944.

We claim:

1. An apparatus for producing carbon black by the thermal decomposition of an endothermic hydrocarbon gas, comprising, a vertical chamber in which the gas is decomposed, an inlet tube projecting into said chamber, said tube being of relatively small diameter compared with that of the chamber, a cooling jacket surrounding said tube and extending to the inner extremity thereof, fluid connections to said jacket for circulating cooling fluid, a gas connection to said inlet tube, scraping means having a portion conforming to and surrounding the extremity surfaces of the inlet tube and cooling jacket, means for causing said scraping means to pass over said surfaces whereby said surfaces are cleaned, means for supplying gas continuously to the gas inlet, and an outlet adjacent to the bottom of the chamber through which carbon black and gas resulting from the reaction can be continuously removed.

2. An apparatus for producing carbon black by the thermal decomposition of an endothermic hydrocarbon gas, comprising, a vertical retort, a cylindrical jacketed gas inlet tube projecting into the top of said retort and provided with a gas connection and inlet and outlet connections for a cooling liquid, a U-shaped scraper having a portion conforming to and surrounding the extremity surfaces of the inlet tube and the jacket about the same, a shaft connected to said scraper and extending upward through the said inlet tube and beyond, sealing means at the upper end of said inlet tube through which the shaft passes, means at the upper end of said shaft for rotating it whereby the scraper is rotated to scrape the said surfaces of the said inlet tube to which it conforms, and means for providing a continuous and uniform flow of gas through said gas connection and inlet tube, said chamber including an outlet adjacent to its bottom through which carbon black and gas can be continuously removed.

3. An apparatus according to claim 1, including a substantially horizontal flue below said chamber outlet and communicating therewith and extending from the front to the back of the said chamber, and open at the front, and an upwardly extending stack connected to the back of the flue.

CHARLES KAUFMANN.
RONALD HENRY HALL.

REFERENCES CITED

The following references are of record in the file of this patent:

UNITED STATES PATENTS

| Number | Name | Date |
|---|---|---|
| 986,489 | Morehead | Mar. 14, 1911 |
| 1,105,304 | Reed | July 28, 1914 |
| 1,278,180 | McDonald | Sept. 10, 1918 |
| 1,451,367 | Makro | Apr. 10, 1923 |
| 2,121,463 | Wisdom | June 21, 1938 |
| 2,126,838 | Stoner | Aug. 16, 1938 |
| 2,232,727 | Peterkin et al. | Feb. 25, 1941 |
| 2,453,440 | Kaufmann et al. | Nov. 9, 1948 |